June 26, 1956  C. G. COOPER  2,751,651
BAND-CLAMPS FOR CONDUITS
Filed Jan. 30, 1953
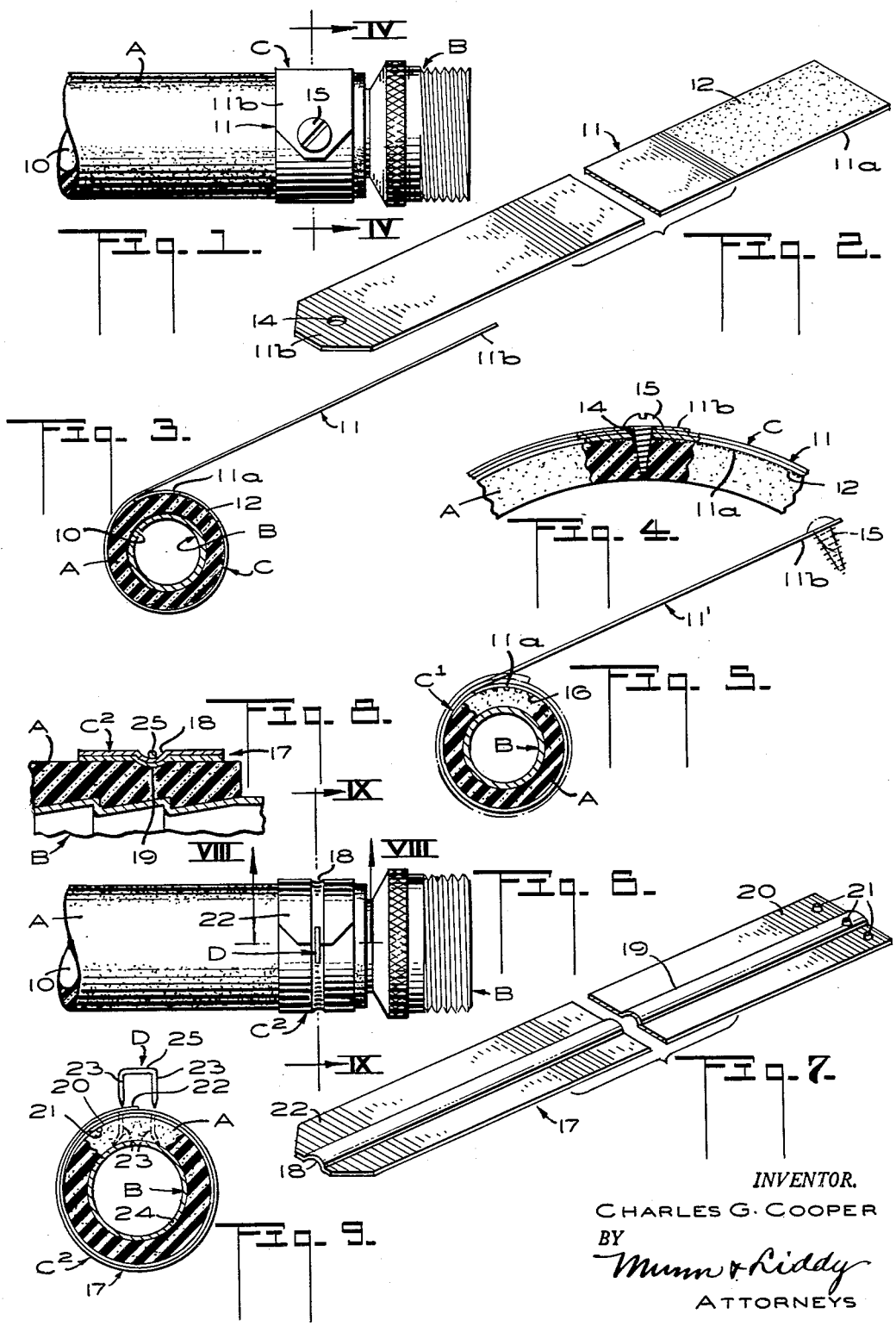
INVENTOR.
CHARLES G. COOPER
BY
Munn & Liddy
ATTORNEYS United States Patent Office 2,751,651
Patented June 26, 1956

2,751,651

BAND-CLAMPS FOR CONDUITS

Charles G. Cooper, San Francisco, Calif.

Application January 30, 1953, Serial No. 334,226

1 Claim. (Cl. 24—20)

The present invention relates to improvements in band-clamps for conduits. The present application is a continuation-in-part of my copending application on a "Tool For Applying Bands to Conduits," Serial No. 309,343, filed September 12, 1952 (now Patent No. 2,696,745, dated December 14, 1954).

An object of this invention is to provide a band-clamp, which may be applied readily to a conduit, for instance, for the purpose of securing a coupling member to a hose. The band-clamp is made in such a manner that it is retained against slippage relative to the conduit during and following the application of the band clamp thereto.

More specifically stated, I provide a strip-like band, which is adapted to be wrapped around a conduit so as to at least overlap itself. The innermost convolution of the band is provided with means for anchoring the same to the conduit to prevent slippage therebetween. Subsequently, the remainder of the band is wrapped upon the conduit to constrict the latter. Thereafter, the overlapped portions, or superimposed layers, of the band are anchored together to hold the applied band against rotary and longitudinal movements relative to the conduit.

Other objects and advantages will appear as the specification continues. The novel features will be set forth in the claim hereunto appended.

Drawings

For a better understanding of the invention, reference should be had to the accompanying drawing, forming part of this application, in which:

Figure 1 is a side elevational view of a conduit having a coupling member secured thereto by one form of my band-clamp;

Figure 2 is an isometric view of the strip-like band employed in Figure 1;

Figure 3 is a vertical transverse sectional view taken through the conduit of Figure 1, and disclosing the band in the process of being wrapped therearound;

Figure 4 is an enlarged sectional view taken along the transverse plane IV—IV of Figure 1;

Figure 5 is a view similar to Figure 3, but showing a modification in which projections are provided on the band for anchoring the innermost convolution thereof to the conduit;

Figure 6 is a side elevational view of another conduit having a coupling member attached thereto by a modified form of a band-clamp, the latter being similar to that disclosed in copending application, Serial No. 309,343;

Figure 7 is an isometric view of a strip-like band utilized in Figure 6;

Figure 8 is an enlarged longitudinal sectional view taken along the line VIII—VIII of Figure 6; and Figure 9 is a transverse sectional view taken along the plane IX—IX of Figure 6.

While I have shown only the preferred forms of my invention, it should be understood that various changes, or modifications, may be made within the scope of the annexed claim without departing from the spirit thereof.

Detailed description

Referring to the first embodiment, as shown in Figures 1 to 4, inclusive, I have disclosed a flexible conduit A having a coupling member B inserted into the bore 10 thereof. In this form, an improved band-clamp C is utilized for clamping an end section of the conduit in constricted relation upon the coupling members to produce a liquid-tight joint therebetween.

As shown in Figure 2, the band-clamp C is fashioned from a strip-like piece of material 11, which is adapted to be wrapped around the conduit A so as to at least overlap itself to define superimposed layers. When thus applied with sufficient tension, the band will force the conduit into fluid-tight relation with the coupling member.

With particular reference to Figures 2 and 3, it will be noted that the conduit-confronting face at the inner section 11a of the band has cement 12 applied thereto. The purpose of this cement is to bond the inner convolution of the band to the conduit, preventing the former from slipping relative to the latter as the band is wrapped in place.

The outer end 11b of the band may be provided with an opening 14 therein. After the band has been wrapped around the conduit under sufficient tension, a punch (not shown) may be inserted through the opening 14 and driven through the other layers of the band.

Thereafter, a tapered screw 15 may be introduced through the opening 14 and the punched openings in the layers therebeneath, with the screw entering the wall of the conduit A, as in Figure 4. The thicknesses of the band layers enter the threads on the screw, providing a tight connection between the several layers of the band. Moreover, this screw will hold the band against rotary and longitudinal movements relative to the conduit.

As an alternative, Figure 5 shows a modified band-clamp C1 having the conduit-embracing surface of the inner section 11a of the band strip 11' as being provided with one or more projections 16, or roughened surface. These projections are arranged to penetrate into the wall of the conduit A to prevent slippage of the band C1 relative to this conduit. Of course, the outer end 11b of this band may be anchored in place by a screw 15 in the same manner as previously described.

Turning now to the third embodiment, as shown in Figures 6 to 9, inclusive, the band-lamp C2 is made from a strip-like piece of material 17 illustrated in Figure 7. This strip is preformed with an offset extending lengthwise thereof, with this offset defining a groove 18 in its outer face thereof and a projecting rib 19 on its opposing or inner face.

Upon wrapping the band C2 around the conduit A, for example, by the tool disclosed in my copending application, Serial No. 309,343 (now Patent No. 2,696,745, dated December 14, 1954), the rib 19 is placed against this conduit. As the band is wrapped in place, the rib 19 of one layer enters the groove 18 of the adjacent underneath layer of the band.

In Figures 7 and 9, the end 20 of the band C2 has at least one projection 21 thereon, which may be pressed into the wall of the conduit A. This will prevent the band from slipping relative to the conduit as the band strip is wrapped around the latter.

After the band C2 has been completely wrapped about the conduit, a punch (not shown) may be utilized to make spaced-apart holes through the strip near the outermost free end 22 so that a staple D may be driven through the layers of the band and into the wall of the conduit. It will be appreciated, of course, that a small nail, screw, or other suitable fastening means may be employed for anchoring the band in place.

In the event that the staple D is used, the legs 23—23 thereof may be long enough to strike a tubular sleeve 24 of the coupling member B, and thereby cause the lower ends of these legs to spread in opposite directions, as suggested by the dot-dash lines in Figure 9. The cross-bar 25 of the staple may be accommodated in the groove 18 of the outermost layer of the band strip (see Figure 8).

I claim:

In a band-clamp for a conduit: a strip-like band wrapped around a conduit to overlap itself; the wrapped band being substantially spiral-shaped from end to end thereof, and defining opposing lateral edges; this band having a preformed offset disposed substantially midway between and parallel with said lateral edges, and extending lengthwise of the band; this offset defining a groove in one face of the band and a projecting rib on its opposing face; both the rib and the groove extending throughout the entire length of the band between opposing ends thereof; the rib being disposed in the groove in the overlapped portion of the band; and a staple having a pair of legs extending through the layers of the overlapped portion of the band and penetrating into the conduit; the lower ends of these legs sloping in opposite directions to thereby anchor the staple to the conduit; the staple including a cross-bar at its top, which is confined in the groove of the band.

References Cited in the file of this patent

UNITED STATES PATENTS

| | | |
|---|---|---|
| 401,283 | Knapp et al. | Apr. 9, 1889 |
| 663,423 | Dederick | Dec. 11, 1900 |
| 809,756 | Staude | Jan. 9, 1906 |
| 916,076 | Whitmore | Mar. 23, 1909 |
| 1,454,298 | Stahl | May 8, 1923 |
| 1,477,975 | Olson | Dec. 18, 1923 |
| 1,708,326 | Rastall | Apr. 9, 1929 |
| 1,799,468 | Johnson et al. | Apr. 7, 1931 |
| 1,804,725 | Walker | May 12, 1931 |
| 2,000,763 | Lane | May 7, 1935 |
| 2,312,575 | McKee | Mar. 2, 1943 |
| 2,318,816 | Tinnerman | May 11, 1943 |

FOREIGN PATENTS

| | | |
|---|---|---|
| 409,768 | France | Feb. 24, 1910 |